United States Patent Office 3,458,578
Patented July 29, 1969

3,458,578
AMINODIBENZOCYCLOALKENONES
Eugene Galantay, Morristown, N.J., assignor to Sandoz Inc., Hanover, N.J.
No Drawing. Filed Mar. 22, 1965, Ser. No. 441,901
Int. Cl. C07c 87/28, 87/50; A61k 27/00
U.S. Cl. 260—576  6 Claims

ABSTRACT OF THE DISCLOSURE

Aminodibenzocycloalkenones, e.g., 4-amino-10,11-dihydro-5H-dibenzo[a,d]cyclohepten-5-one. The compounds are useful as hypotensive-antihypertensives.

---

The present invention is directed to two classes of compounds of the general formula

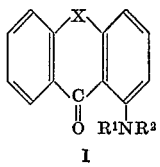

I wherein $R^1$ is either a hydrogen atom (—H) or lower alkyl, e.g., methyl, ethyl, propyl, isopropyl and butyl;
$R^2$ is either a hydrogen atom (—H); lower alkyl, e.g., methyl, ethyl, propyl, isopropyl and butyl; α-halo(lower)acyl [—CO—CHR—Y], e.g., iodoacetyl; or α-amino (lower)acyl [—CO—CHR—$NH_2$], e.g., glycyl;
R is either a hydrogen atom (—H) or lower straight chain alkyl, e.g., methyl, ethyl, propyl and butyl;
Y is a halogen atom, e.g., —Cl, —Br, —F and —I; and
X is dimethylene (—$CH_2$—$CH_2$—) for the first class and trimethylene (—$CH_2$—$CH_2$—$CH_2$—) for the second class;

and to processes for preparing said compounds.

The import of 2-amino and 2-acylaminobenzophenones

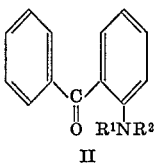

II as intermediates for the synthesis of medicinally useful compounds is documented by, e.g., S. L. Childress and M. I. Gluckham, "J. of Pharm Sci.," 53, 577 (1964). In these aminobenzophenones and in the medicinally useful derivatives therefrom the two benzene rings may assume a large number of relative spatial orientations. The introduction of a dimethylene or trimethylene bridge between the 6- and 2'-positions of II leads to the tricyclic compounds

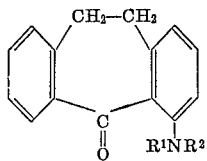 and 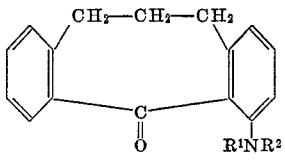

III                                 IV of this invention, in which the relative spatial orientation of the two benzene rings is more rigidly set. From the foregoing it could be expected only that the biological activity of corresponding final products would be modified, and not that compounds I actually possess self utility as antihypertensives.

Introducing substituents into the 4-position of known dibenzoalkanones

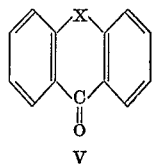

V by direct electrophilic substitutions, e.g., nitration and halogenation, is ineffective since the substitution takes place preferentially, if not exclusively, at other carbon atoms. The amino substituent, however, can be selectively introduced into the 4-position by the use of an intramolecular substitution, i.e., by forming and reopening a fourth, pyridone-type ring annealed to positions 4 and 5 of the starting tricyclic system.

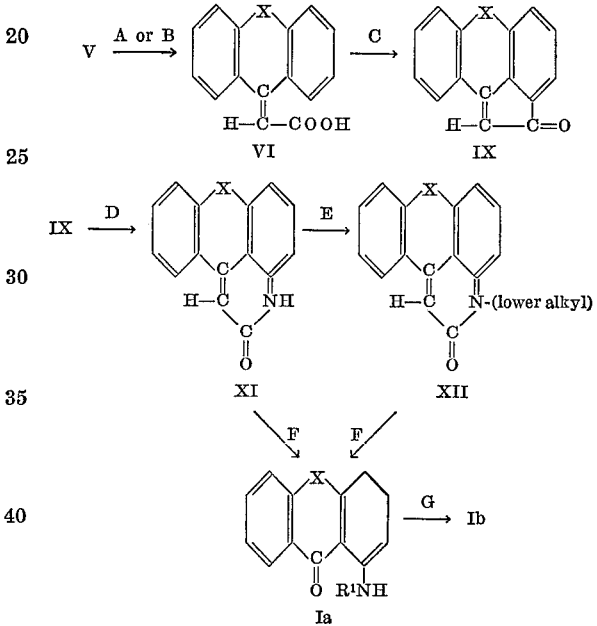

The starting dibenzoalkanone V is first converted to the unsaturated carboxylic acid derivative VI. When X is dimethylene the preferred method A comprises reacting V with tert.-butyl acetate [as described by S. O. Winthrop et al., "J. Org. Chem.," 27, 230 (1962)], followed by refluxing a toluene solution of the 5-hydroxy-5-tert.-butoxycarbonylmethyl - 10,11 - dihydro-5H-dibenzo(a,d)cyclohepten-5-one.

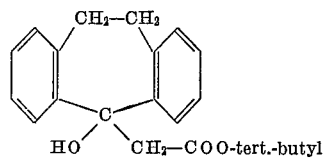

VII thus formed with a small amount of para-toluenesulfonic acid under azeotropic water-removal conditions. The same compound VI is alternatively prepared by the "Reformatsky synthesis."

When X is trimethylene the preferred method B involves condensing the known 5,10,11,12-tetrahydrodibenzo(a,d)cycloocten-5-one with ethoxyacetylene according to the general method outlined by G. R. Arens ("Advances in Organic Chemistry," vol. II, pages 157 to 161, Interscience Publishers, Inc., New York, N.Y., 1960), followed by the rearrangement and the saponification of the condensation product

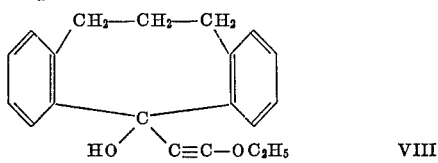
VIII

Carboxylic acid derivatives VI, thus obtained, are cyclized C to the ring ketones IX. Structures

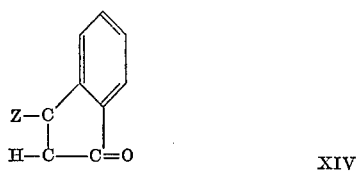
XIV wherein Z is either a hydrogen atom (—H); lower alkyl, e.g. methyl and ethyl; or aryl, e.g. phenyl; are sensitive and are difficult or impossible to obtain [Rockett, B. W., and Hauser, C. R., "J.O.C.", 29, 1394 (1964)] by the usual acid-catalyzed cyclization methods since they ordinarily dimerize to "truxone"-type compounds or undergo other secondary reactions in acid media; the obtained good yields using solutions of polyphosphoric acid in glacial acetic acid and temperatures of from 60° to 120° C. (but preferably reflux) were therefore unexpected. Polyphosphoric acid alone, a generally used cyclizing agent, produces little (if any) of the desired ketones and, even at room temperature (20° C.), yields essentially higher condensation products.

Compound VII also cyclizes directly to the corresponding compound IX in a glacial acetic acid solution of polyphosphoric acid. Cyclization C is, alternatively, effected with a trifluoroacetic anhydride/trifluoroacetic acid mixture at a temperature preferably below 0° C. The latter cyclization, however, is more costly and less readily controlled.

Ketones IX are readily purified by adsorption chromatography, e.g. on alumina and on silica gel. Such purification may be omitted since the crude ketones IX may be employed for reaction D to obtain compounds XI, which are easliy purified by simple recrystallization.

Reaction D inserts the function =N—H between the carbonyl group of ketone IX and the adjacent benzene ring. The preferred procedure, a modified "Schmidt Reaction," results in the preparation of compounds XI free of isomeric side products, i.e. the insertion takes place exclusively at the indicated position.

Reaction E is an alkylation to produce compound XII wherein $R^1$ is lower alkyl.

In reaction F the pyridone ring of the tetracyclic intermediate (XI or XII) is reopened by oxidation (preferably with ozone, but other methods, e.g. oxidation with sodium bichromate in acetic acid/benzene, are also applicable) to produce

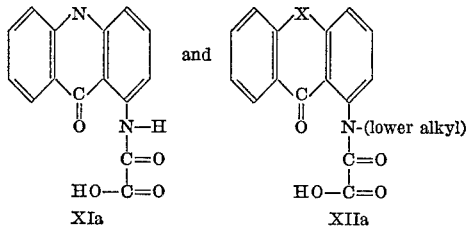

which, after hydrolysis, yield compounds Ia. $R^1$ is —H in the hydrolyzation product of XIa and is lower alkyl in the hydrolyzation product of XIIa.

Reaction G is a standard acylation by which one hydrogen bonded to the amino nitrogen of Ia is acylated. An alkylation of compounds Ia results in replacing any amino hydrogens by lower alkyls.

Compounds I wherein $R^1$ and/or $R^2$ is a hydrogen atom are intermediates for the preparation of compounds I wherein at least one of said hydrogens is replaced. Compounds I are useful as hypotensive-antihypertensives. They are administered either orally or parenterally in daily doses of from 25 to 75 milligrams.

Each of the pharmaceutically active compounds of this invention, may be, e.g., incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

|  | Parts |
|---|---|
| Title compound of Example 8 | 15 |
| Tragacanth | 2 |
| Lactose | 74.5 |
| Corn starch | 5 |
| Talcum | 3 |
| Magnesium stearate | 0.5 |
| Alcohol SD–30 | q.s. |
| Purified water | q.s. |

The following examples are merely illustrative. Those examples wherein X is ethylene, i.e. dimethylene, are equally illustrative of the corresponding reactions and products wherein X is trimethylene, and vice versa. In all of the examples the parts and percentages are by weight unless otherwise specified, and the temperatures are in degrees centigrade. The relationship between parts by weight and parts by volume is the same as that between the kilogram and the liter.

EXAMPLE 1

5-carboxymethylidene-10,11-dihydro-5H-dibenzo[a,d]
cycloheptene

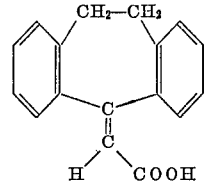

Heat a solution of 5 parts of para-toluenesulfonic acid in 1000 parts by volume of toluene under an azeotropic water-removal trap. Add to the solution 404 parts of 5-hydroxy - 5-tert.-butyloxycarbonylmethyl-10,11-dihydro-5H-dibenzo[a,d]cycloheptene ["J. Org. Chem.," 27, 230 (1962)], and reflux the resulting mixture until 22 parts by volume of water are formed.

Concentrate the reflux to a very thick crystal slurry. Filter 215 parts of title compound, M.P. 167° to 170°, from the slurry. Recover an additional 94 parts of title compound from the mother liquor.

EXAMPLE 2

6,7-dihydro-2H-benzo[j]benz[c,d]azulen-2-one

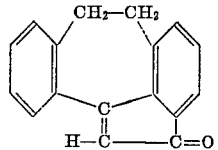

Admix 40 parts of 5-carboxymethylidene-10,11-dihydro-5H-dibenzo[a,d]cycloheptene with 60 parts of polyphosphoric acid in 600 parts of glacial acetic acid and reflux the resulting solution for 18 hours. Pour the reaction mixture onto ice, and dissolve the resulting orange precipitate in chloroform. Wash the obtained chloroform solution with 2 N sodium hydroxide solution to separate any unreacted 5-carboxymethylidene-10,11-dihydro-5H-dibenzo[a,d]cycloheptene; then evaporate the remaining chloroform solution to give 31 parts of the crude 6,7-dihydro-2H-benzo[j]benz[c,d]azulen-2-one. Purify by chromatography on silica gel to separate the compound of this example from 5-methylidene-10,11-dihydro-5H-dibenzo-[a,d]cycloheptene, M.P. 56° to 58°. The pure product is an orange solid, M.P. 66° to 67°.

EXAMPLE 3

2,6,7,8-tetrahydrocyclopenta[d,e]dibenzo[a,d]cyclo-octen-2-one

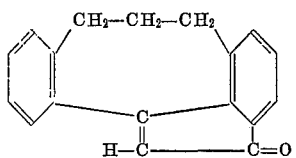

React 50 parts of 5,10,11,12-tetrahydrodibenzo[a,d]cycloocten-5-one with the Grignard derivative of 15.75 parts of ethoxy-acetylene in tetrahydrofuran, following the general method described by Arens, G. R., volume II, pp. 157 to 161, "Advances in Organic Chemistry," Interscience Publishers, Inc., New York, N.Y., 1960. Treat the crude product with acid, then saponify with alcoholic potassium hydroxide to isolate, after acidification, 5-carboxymethylidene - 5,10,11,12 - tetrahydrodibenzo[a,d]cyclooctene, M.P. 170° to 172°. Dissolve 40 parts of the foregoing product with 60 parts of polyphosphoric acid in 600 parts of glacial acetic acid, and heat the resulting solution under reflux for 30 minutes. Pour the reaction mixture onto ice, and dissolve the resulting orange precipitate in chloroform. Wash the obtained chloroform solution with 2 N sodium hydroxide solution with water and dry; then evaporate the remaining chloroform solution to obtain 53.2 parts of an orange oil, which consists of 85% of the desired 2,6,7,8-tetrahydrocyclopenta[d,e]dibenzo[a,d]cycloocten-2-one and 15% of side product, 5 - methylidene-5,10,11,12-terahydrodibenzo[a,d,]cyclooctene. Separate the pure title compound by chromatography.

EXAMPLE 4

2,3,7,8-tetrahydrodibenzo[f,][j,k]cyclohepta[c]pyridin-2-one

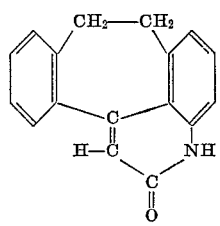

To a stirred mixture of 2.0 parts of sodium azide, 18 parts of glacial acetic acid and 15 parts of sulfuric acid, add dropwise over a ten-minute period at 55° to 65° a solution of 2.66 parts of crude 6,7-dihydro-2H-benzo[j]benz[c,d]azulen-2-one in glacial acetic acid. Maintain the reaction mixture at 55° for 30 minutes and then pour onto ice. Filter the resultant solid; then wash said solid with water and dimethylformamide, and recrystallize same from 18 parts by volume of boiling dimethylformamide to obtain 1.90 parts of 2,3,7,8-tetrahydrodibenzo-[f][j,k]cyclohepta[c]pyridin-2-one, M.P. 279°.

EXAMPLE 5

2,3,8,9-tetrahydro-7H-dibenzo[f][k,l]cycloocta[c]pyridin-2-one

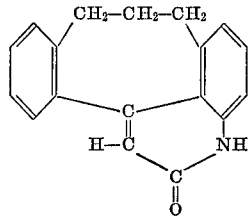

To a stirred mixture of 2.0 parts of sodium azide, 18 parts of glacial acetic acid, and 15 parts of sulfuric acid, add dropwise over a ten-minute period at 55° to 65° a solution of 2.70 parts of 2,6,7,8-tetrahydrocyclopenta[d,e]dibenzo[a,d]cycloocten-2-one in glacial acetic acid. Maintain the reaction mixture at 55° for 30 minutes and then pour onto ice. Filter the resultant solid; then wash said solid with water and diethylether. Recrystallize from ethanol to obtain 2.30 parts of 2,3,8,9-tetrahydro-7H-dibenzo[f][k,l]cycloocta[c]pyridin - 2 - one, M.P. 290° to 293°.

EXAMPLE 6

3-methyl-2,3,7,8-tetrahydrodibenzo[f][j,k]cyclohepta[c]pyridin-2-one

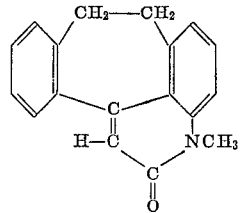

Admix with stirring 50 parts of 2,3,7,8-tetrahydrodibenzo[f][j,k]cyclohepta[c]pyridin-2-one and 23 parts of freshly sublimed potassium tert.-butoxide in 500 parts of dimethyl sulfoxide. Continue stirring until the formation of the potassium salt of 2,3,7,8-tetrahydrodibenzo[f][j,k]cyclohepta[c]pyridin-2-one is complete. Strip off the thereby-formed tert.-butyl alcohol in vacuo; then add 200 parts of methyl iodide. Filter 16 hours. Strip off the excess methyl iodide in vacuo; add water to complete the separation of the product and filter to obtain 3-methyl-2,3,7,8-tetrahydrodibenzo[f][j,k]cyclohepta[c]pyridin - 2 - one, M.P. 198°.

EXAMPLE 7

4-amino-10,11-dihydro-5H-dibenzo[a,d]cyclohepten-5-one

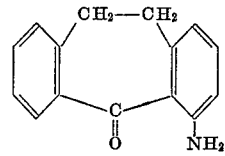

Admix at room temperature a solution of 189 parts of 2,3,7,8 - tetrahydrodibenzo[f][j,k]cyclohepta[c]pyridin-2-one in 32 parts by volume of glacial acetic acid with a stream of ozone-containing oxygen until one equivalent of ozone has been absorbed. Add 10 parts by volume of water to the reaction mixture and heat at 100° for one hour to decompose the ozonide. Evaporate to dryness; then reflux the crude intermediate for 30 minutes with 3 parts of glacial acetic acid and 8 parts of concentrated hydrochloric acid. Stir the resultant residue with aqueous 1 N sodium hydroxide solution and chloroform. Evaporate the chloroform solution to obtain the crude 4-amino-10,11-dihydro-5H-dibenzo[a,d]cyclohepten-5-one. Purify by percolation through silica gel; N-(bromoacetyl) derivative, M.P. 168°.

EXAMPLE 8

4-methylamino-10,11-dihydro-5H-dibenzo[a,d]cyclohepten-5-one

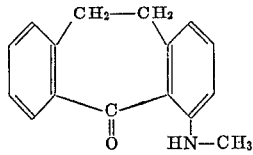

Add dropwise with stirring at 0° to 5°, 15.6 parts of 3 - methyl - 2,3,7,8-tetrahydrodibenzo[f][j,k]cyclohepta[c]pyridin-2-one to a solution of 35.8 parts of sodium dichromate dihydrate, 180 parts by volume of acetic acid and 120 parts by volume of benzene, dissolved in a minimum of acetic acid. Continue stirring for 2 hours; then add to the resultant 720 parts by volume of water. Wash the product with water, dry, and evaporate the benzene layer to dryness. Admix the residue (containing the intermediate) with 50% sulfuric acid at room temperature, and add enough aqueous sodium hydroxide to the reaction mixture to raise the pH to 9.5. Extract the resultant product with chloroform and purify on silica gel to obtain 4 - methylamino - 10,11-dihydro-5H-dibenzo[a,d]cyclohepten-5-one.

EXAMPLE 9

4-amino-5,10,11,12-tetrahydrodibenzo[a,d]cycloocten-5-one

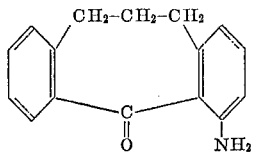

Admix at room temperature a solution of 242 parts of 2,3,8,9 - tetrahydro - 7H - dibenzo[f][k,l]cycloocta[c]pyridin-2-one in 32 parts by volume of glacial acetic acid with a stream of ozone-containing oxygen in which one equivalent of ozone has been absorbed. Add 10 parts by volume of water to the reaction mixture and heat at 100° for one hour to decompose the formed ozonide. Evaporate to dryness; then reflux the crude intermediate for 30 minutes with 3 parts of glacial acetic acid and 8 parts of concentrated hydrochloric acid. Stir the resultant residue with aqueous 1 N sodium hydroxide solution and chloroform. Evaporate the chloroform solution to obtain the crude 4-amino-5,10,11,12-tetrahydrodibenzo[a,d] cycloocten-5-one. Purify by chromatography on silica gel.

EXAMPLE 10

4-iodoacetyl-methylamino-10,11-dihydro-5H-dibenzo[a,d]cyclohepten-5-one

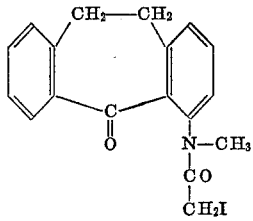

Reflux a solution of 1.4 parts of 4-methylamino-10,11-dihydro-5H-dibenzo[a,d]cyclohepten-5-one and 1.2 parts of bromoacetyl chloride in 50 parts by volume of dioxane. Evaporate the resultant to obtain 2.3 parts of oily bromoacetyl compound. Reflux the latter wtih a mixture of 2 parts of sodium iodide and 50 parts by volume of acetone for 30 minutes. Evaporate the acteone from the product, add water and sodium hydrocarbonate and extract the resultant with methylene dichloride. Crystallize the extract from ethyl acetate diethylether to obtain the title compound, M.P. 85°.

EXAMPLE 11

4-glycyl-methylamino-10,11-dihydro-5H-dibenzo[a,d]cyclohepten-5-one

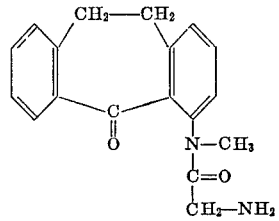

Add to a cold solution of 2.5 parts of 4-iodoacetyl-methylamino - 10,11 - dihydro-5H-dibenzo[a,d]cyclohepten-5-one in 20 parts by volume of methylene dichloride and 20 parts by volume of methanol, 20 parts by volume of liquid ammonia. Maintain solution overnight (17 hours) at room temperature, evaporate to dryness and wash methylene chloride solution of the residue with 0.5 N sodium hydroxide and water. Evaporation of the dried methylene chloride solution yields title compound.

It is apparent that various changes may be made in the intermediates and the final products without departing from the spirit and scope of the invention or sacrificing its material advantages. The products hereinbefore described are merely exemplary of all products within the scope of compounds I.

What is claimed is:
1. A compound of the formula:

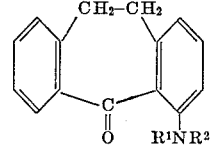

wherein
$R^1$ is hydrogen or lower alkyl; and
$R^2$ is hydrogen or lower alkyl.
2. The compound according to claim 1 which is 4-amino-10,11-dihydro-5H-dibenzo[a,d]cyclohepten-5-one.
3. A compound according to claim 1 which is a 4-(lower)alkylamino - 10,11-dihydro-5H-dibenzo[a,d]cyclohepten-5-one.
4. The compound according to claim 3 which is 4-methylamino-10,11-dihydro-5H-dibenzo[a,d]cyclohepten-5-one.
5. A compound according to claim 1 which is a 4-di(lower)alkylamino - 10,11-dihydro-5H-dibenzo[a,d]cyclohepten-5-one.
6. The compound according to claim 5 which is 4-dimethylamino - 10,11 - dihydro - 5H-dibenzo[a,d]cyclohepten-5-one.

References Cited

UNITED STATES PATENTS 3,291,828   12/1966   Kotera et al. _____ 260—578

CHARLES B. PARKER, Primary Examiner

PATRICIA C. IVES, Assistant Examiner

U.S. Cl. X.R.

260—269, 473, 515, 518, 562, 578, 590, 611; 424—324, 330